United States Patent [19]
Shimizu et al.

[11] Patent Number: 6,148,948
[45] Date of Patent: *Nov. 21, 2000

[54] ELECTRIC POWER STEERING APPARATUS

[75] Inventors: Yasuo Shimizu; Yoshito Nakamura, both of Wako, Japan

[73] Assignee: Honda Giken Kogyo Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/053,205

[22] Filed: Apr. 1, 1998

[30] Foreign Application Priority Data

Apr. 3, 1997 [JP] Japan .................................. 9-085012

[51] Int. Cl.$^7$ ..................................................... B62D 5/04
[52] U.S. Cl. ............................................. 180/446; 701/41
[58] Field of Search .................................. 180/443, 444, 180/445, 446; 701/41, 42

[56] References Cited

U.S. PATENT DOCUMENTS

| | | |
|---|---|---|
| 5,182,711 | 1/1993 | Takahashi et al. . |
| 5,425,574 | 6/1995 | Sano . |
| 5,467,281 | 11/1995 | Iwashita et al. . |
| 5,612,877 | 3/1997 | Shimizu et al. . |
| 5,698,956 | 12/1997 | Nishino et al. ........................ 180/443 |
| 5,732,373 | 3/1998 | Endo ........................................ 701/42 |
| 5,839,537 | 11/1998 | Nishino et al. ........................ 180/443 |
| 5,927,430 | 7/1999 | Mukai et al. ........................... 180/446 |

*Primary Examiner*—Kevin Hurley
*Attorney, Agent, or Firm*—Merchant & Gould P.C.

[57] ABSTRACT

An electric power steering apparatus, which has an electric motor incorporated in a steering system to provide steering power assist directly to the steering system to thereby reduce manual steering effort required by the driver, includes a steering torque differentiating section arranged to output a differential value of a component of the steering torque which is free from a near-dc component and a high frequency component, a motor control signal determining section for subtracting a value corresponding to the steering velocity from a value corresponding the steering torque and adding the value corresponding to the steering torque to a value corresponding to the differential value to thereby determine a motor control signal, and a motor drive section for driving the electric motor on the basis of the motor control signal. With this arrangement, the electric power steering apparatus can improve the response characteristics of the steering power assist system while preventing undue increase in the gain of the control system at low frequencies in the range of 2 to 4 Hz, for example.

6 Claims, 10 Drawing Sheets

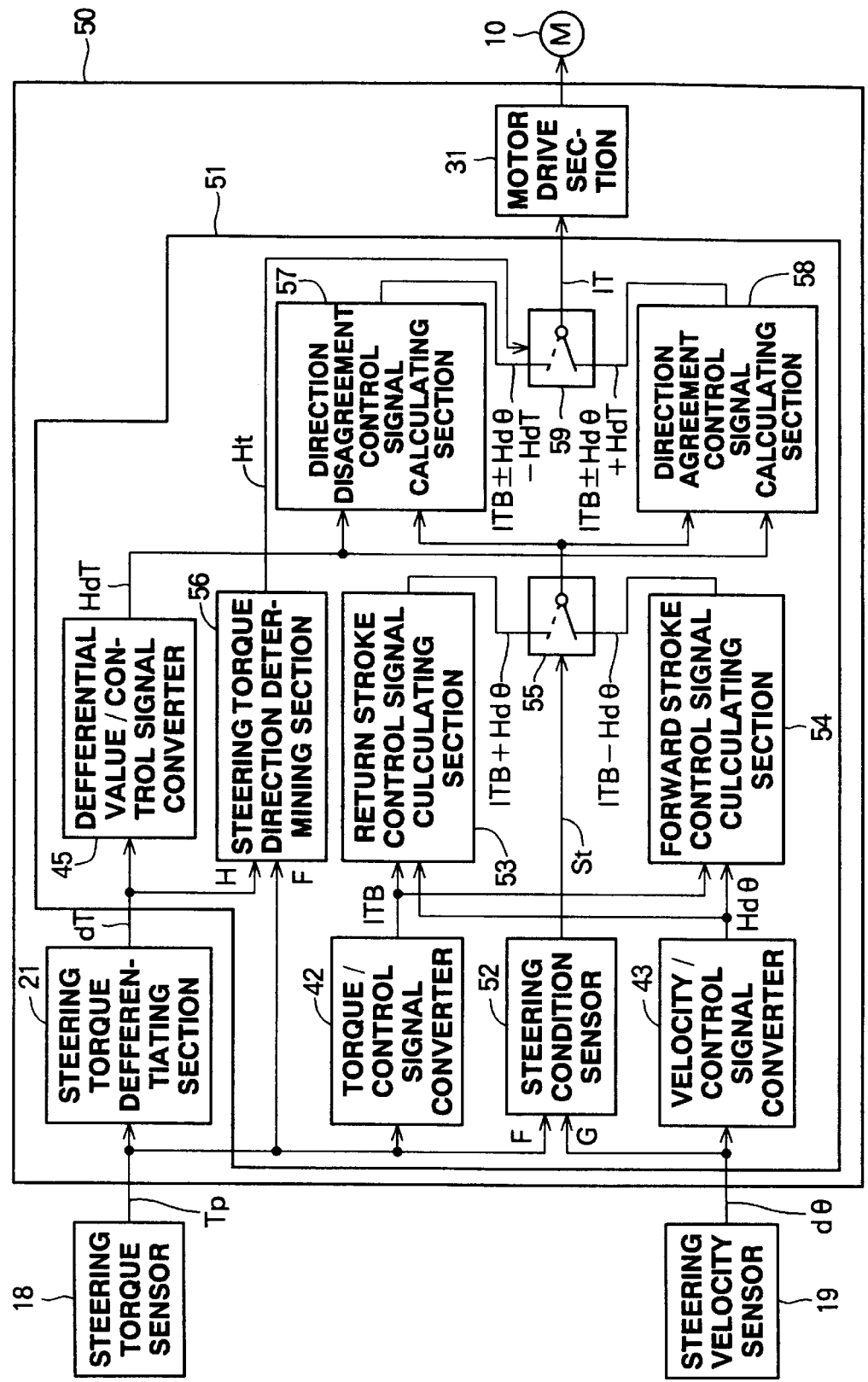

ELECTRIC POWER STEERING APPARATUS

BACKGROUND OF THE INVENTION

1. Field of the Invention

The present invention relates to improvements in an electric power steering apparatus which provides power assist of an electric motor directly to a steering system so as to reduce manual steering effort to be applied by the driver.

2. Description of the Related Art

FIG. 1 of the accompanying drawings diagrammatically shows the general construction of an electric power steering apparatus of the type concerned. The electric power steering apparatus 1 includes an electric motor 10 incorporated in a steering system, and a control unit 20 for controlling power assist supplied from the electric motor 10, so as to reduce the manual steering effort or force required by the driver.

The steering system includes a steering wheel 2 attached to an end of a steering shaft 3. The opposite end of the steering shaft 3 is connected to one end of a connecting shaft 4 via a first universal joint 4a, the other end of the connecting shaft 4 being connected via a second universal joint 4b to a pinion 6 of a rack-and-pinion mechanism 5. The pinion 6 is in mesh with a rack 7 which is a long bar with gear teeth 7a cut into one side. The rack-and-pinion mechanism 5 translates a rotary motion of the pinion 6 into an axial reciprocating motion of the rack 7. Opposite ends of the rack 7 are connected via tie rods 8 to steerable left and right front wheels 9, 9. When the steering wheel 2 is manually turned or rotated in a desired direction, the rack-and-pinion mechanism 5 and the tie rods 8 cause the front wheels 9 to pivot in the same direction to thereby change the direction of movement of a motor vehicle.

In order to reduce the manual steering effort or force required by the driver, the electric motor 10 is disposed in concentric relation to the rack 7 and supplies an assist torque (steering assist torque) to the rack 7 via a ball screw mechanism 11. The ball screw mechanism 11 converts rotational power of the electric motor 10 into an axial thrusting force acting on the rack 7. The ball screw mechanism 11 is generally comprised of a nut 12 connected to a rotor of the electric motor 10, and a threaded screw portion 7b formed along a longitudinal portion of the rack 7. By virtue of the threaded engagement between the nut 12 and the threaded screw portion 7b, a rotational force of the nut 12 is converted into an axial thrusting force of the rack 7. Thus, the assist torque generated by the electric motor 10 is translated into the axial thrusting force of the rack 7 by which manual steering effort required by the driver to turn the steering wheel 2 is reduced.

A steering torque detecting section (steering torque sensor) 18 detects a manual steering torque Ts acting on the pinion 6 and supplies a torque signal Tp indicative of the detected steering torque Ts to the control unit 20. The control unit 20 outputs, on the basis of the torque signal Tp, a motor control signal 20a to control output power (steering assist torque) of the electric motor 10.

FIG. 2 of the accompanying drawings shows in block diagram the general arrangement of a first conventional control unit. The control unit 20A includes a target assist torque determining section 201 and a motor drive section 202. The target assist torque determining section 201 determines a target assist torque on the basis of the torque signal Tp and outputs the determined target assist torque in the form of a target assist torque signal 201a. More specifically, the target assist torque determining section 201 sets the target assist torque to be zero when an absolute value of the steering torque is less than a predetermined dead zone threshold. Conversely, when the absolute value of steering torque is greater than the predetermined dead zone threshold, a target assist torque which is proportional to the steering torque is output from the target assist torque determining section 201. The target assist torque output from the target assist torque determining section 201 is limited below an upper limit even when the steering torque increases excessively.

The motor drive section 202 outputs, on the basis of the target assist torque signal 201a, a motor drive signal 20a to drive the electric motor 10 so that the target assist torque is supplied from the electric motor 10.

FIG. 3 shows in block diagram the general arrangement of a second conventional control unit. The control unit 20B includes a first target assist torque determining section 211, a steering torque differentiating section 212, a second target assist torque determining section 213, an adding section or adder 214, and a motor drive section 202.

The first target assist torque determining section 211 determines a first target assist torque on the basis of the torque signal Tp and outputs the determined first target assist torque in the form of a first target assist torque signal 211a. More specifically, the first target assist torque determining section 211 sets the first target assist torque to be zero when an absolute value of the steering torque is less than a predetermined dead zone threshold. Conversely, when the absolute value of steering torque is greater than the predetermined dead zone threshold and less than a predetermined threshold, a first target assist torque which is proportional, with low gain, to the steering torque is output from the first target assist torque determining section 211. A steering torque greater than the predetermined threshold causes the first target assist torque determining section 211 to output a first target assist torque which is proportional, with high gain, to the steering torque. The first target assist torque output from the first target assist torque determining section 211 is limited below an upper limit even when the steering torque increases excessively.

The steering torque differentiating section 212 determines a variation per unit time of the torque signal Tp and outputs the determined variation in the form of a differential torque signal 212a (Tp·s in a Laplace transform range).

The second target assist torque determining section 213 determines a second target assist torque on the basis of the differential torque signal 212a and outputs the determined second target assist torque in the form of a second target assist torque signal 213a. The second target assist torque output from the second target assist torque determining section 213 is limited below an upper limit even when the differential torque value becomes excessively large.

The adder 214 adds together a signal 211a corresponding to the first target assist torque and a signal 213a corresponding to the second target assist torque and outputs the result of arithmetic operation (addition) in the form of a target assist torque signal 214a.

FIG. 4 shows in block diagram a third conventional control unit which is arranged to control the steering assist torque on the basis of the steering torque and steering velocity. The control unit 20C includes a first target assist torque determining section 221, a third target assist torque determining section 222, a subtracting section or subtractor 223, and a motor drive section 202.

The first target assist torque determining section 221 determines a first target assist torque on the basis of the torque signal Tp and outputs the determined first target assist torque in the form of a first target assist torque signal 221a. A steering velocity detecting section or sensor 19 such as shown in FIG. 1 detects a steering rotational velocity (hereinafter referred to as "steering velocity") θs and outputs the detected steering velocity in the form of a steering velocity signal dθ. The steering velocity signal dθ is supplied to the control unit 20C. The third target assist torque determining section 222 outputs, on the basis of the steering velocity signal dθ, a third target assist torque signal 22a to correct the first target assist torque. The subtractor 223 subtracts the third target assist torque signal 222a from the first target assist torque signal 221a and outputs the result of arithmetic operation (subtraction) in the form of a target assist torque signal 223a.

FIG. 5 shows in block diagram a fourth conventional control unit which is arranged to control the steering assist torque in response to the steering torque and steering velocity. The control unit 20D generally includes a first target assist torque determining section 231, a steering torque differentiating section 232, a second target assist torque determining section 233, a third target assist torque determining section 234, a subtractor 235, an adder 236, and a motor drive section 202.

The first target assist torque determining section 231 determines, on the basis of the torque signal Tp, a first target assist torque corresponding to the steering torque and outputs the determined first target assist torque in the form of a first target assist torque signal 231a. The third target assist torque determining section 234 outputs, on the basis of a steering velocity signal dθ, a third target assist torque signal 234a to correct the first target assist torque. The subtractor 235 subtracts the third target assist torque signal 234a from the first target assist torque signal 231a and outputs the result of arithmetic operation (subtraction) in the form of a subtraction signal 235a. The subtraction signal 235a is supplied to the adder 236.

The steering torque differentiating section 232 determines a variation per unit time of the torque signal Tp and outputs the determined variation in the form of a differential torque signal 232a. The second target assist torque determining section 233 outputs a second target assist torque signal 233a on the basis of the differential torque signal 232a. The adder 236 adds together the subtraction signal 235 and the second target assist torque signal 233a and outputs the result of arithmetic operation (addition) in the form of a target assist torque signal 236a. The target assist torque signal 236a is supplied to the motor drive section 202.

The above-mentioned conventional control units 20A–20D shown in FIGS. 2–5, respectively, have various problems, as described below.

The conventional control unit 20A shown in FIG. 2 controls operation of the electric motor on the basis of only the steering torque and hence is likely to induce a delay in response under the influence of an inertial force produced by the motor or a friction produced in the speed-reducing mechanism (ball screw mechanism). It is therefore difficult to maintain the response to steering input and the stability of a control system with high degree of compatibility. An attempt to increase the gain of steering power assist to improve the response characteristics would deteriorate the stability of the control system, producing parasitic oscillation of the control system.

In the conventional control unit 20B shown in FIG. 3, the differential steering torque signal is used for the correction of steering power assist to thereby improve the response characteristics of the control system. This control unit 20B has a drawback however that a peak in gain (see the broken lined curve shown in FIG. 8A) or a great delay in phase (see the broken lined curve shown in FIG. 8B) of the control system is produced when the steering torque has a low frequency of about 2 Hz to about 4 Hz. The peak of gain or the phase delay forms a resonance point which will deteriorate the control properties of the control unit 20B. Due to an excessively high sensitivity to steering input at the low frequency range, the steering wheel tends to wobble or otherwise become unstable under the influence of external disturbance coming from road surfaces when the vehicle is running on rough terrains. Another drawback with the control unit 20B shown in FIG. 3 is that when the steering torque is below the dead zone threshold of the first target assist torque determining section 211, the signal 214a related directly to the target assist torque is output on the basis of only the differential value of the steering torque. Such a signal 214a fails to provide a firm or positive steering feeling.

The conventional control units 20C and 20D shown in FIGS. 4 and 5 further include a control process achieved on the basis of the steering velocity dθ to improve the steering accuracy. Since the first target assist torque determined in response to the steering torque Tp is corrected by subtracting therefrom the third assist torque corresponding to the steering velocity dθ, the stability of the control system is improved. However, no improvement is expected so far as the response to steering input is concerned.

SUMMARY OF THE INVENTION

With the foregoing drawbacks in view, it is an object of the present invention to provide an electric power steering apparatus which is capable of providing good harmony or compatibility between the response to steering input and the stability of the control system.

According to the present invention, there is provided an electric power steering apparatus which comprises: a steering torque sensor for detecting a steering torque of a steering system; a steering velocity sensor for detecting a steering velocity of the steering system; a steering torque differentiating section for producing a differential value of the steering torque; a motor control signal determining section for subtracting a value corresponding to the steering velocity from a value corresponding the steering torque and adding said value corresponding to the steering torque to a value corresponding to the differential value of the steering torque to thereby determine a motor control signal; an electric motor for providing an assist torque to the steering system; and a motor drive section f or driving the electric motor on the basis of the motor control signal. The steering torque differentiating section is arranged to output a differential value of a component of the steering torque which is free from a component near direct current and a high frequency component.

The terms "adding" and "subtracting" used herein are intended to refer to addition and subtraction of vector quantities each having a direction. Accordingly, addition achieved when the steering torque and the steering velocity and the differential steering torque have the same direction, and subtraction achieved when the steering torque, the steering velocity and the differential steering torque have different directions mean addition of absolute values. Conversely, addition achieved with respect to the steering torque, steering velocity and differential steering torque of different directions, and subtraction achieved with respect to the steering torque, steering velocity and differential steering torque of the same direction mean subtraction of absolute values.

According to the invention, a value corresponding to a differential value of a component of the steering torque which is free from a component near direct current and a high frequency component is added to a value corresponding to the steering torque, and a value corresponding to the steering velocity is subtracted from the value corresponding to the steering torque. The resultant value is used to control steering power assist (steering assist torque) supplied from the electric motor. With this arrangement, the electric power steering apparatus can prevent undue increase in the gain of control system at a low frequency range such as 2 to 4 Hz while providing improved response characteristics of the steering power assist system. A vehicle equipped with the electric power steering apparatus can exhibit high running stability without causing wobbling or oscillation of the steering wheel even when the vehicle is running on rough terrains. Furthermore, even when the steering torque is small, steering operation is performed smoothly with a firm or positive steering feeling.

The above and other objects, features and advantages of the present invention will become manifest to these versed in the art upon making reference to the detailed description and the accompanying sheets of drawings in which preferred structural embodiments incorporating the principles of the invention are shown by way of illustrative examples.

BRIEF DESCRIPTION OF THE DRAWINGS

FIG. 13 is a block diagram showing the general arrangement of a control unit according to a third embodiment of the present invention.

DETAILED DESCRIPTION OF THE PREFERRED EMBODIMENTS

Figure 1:
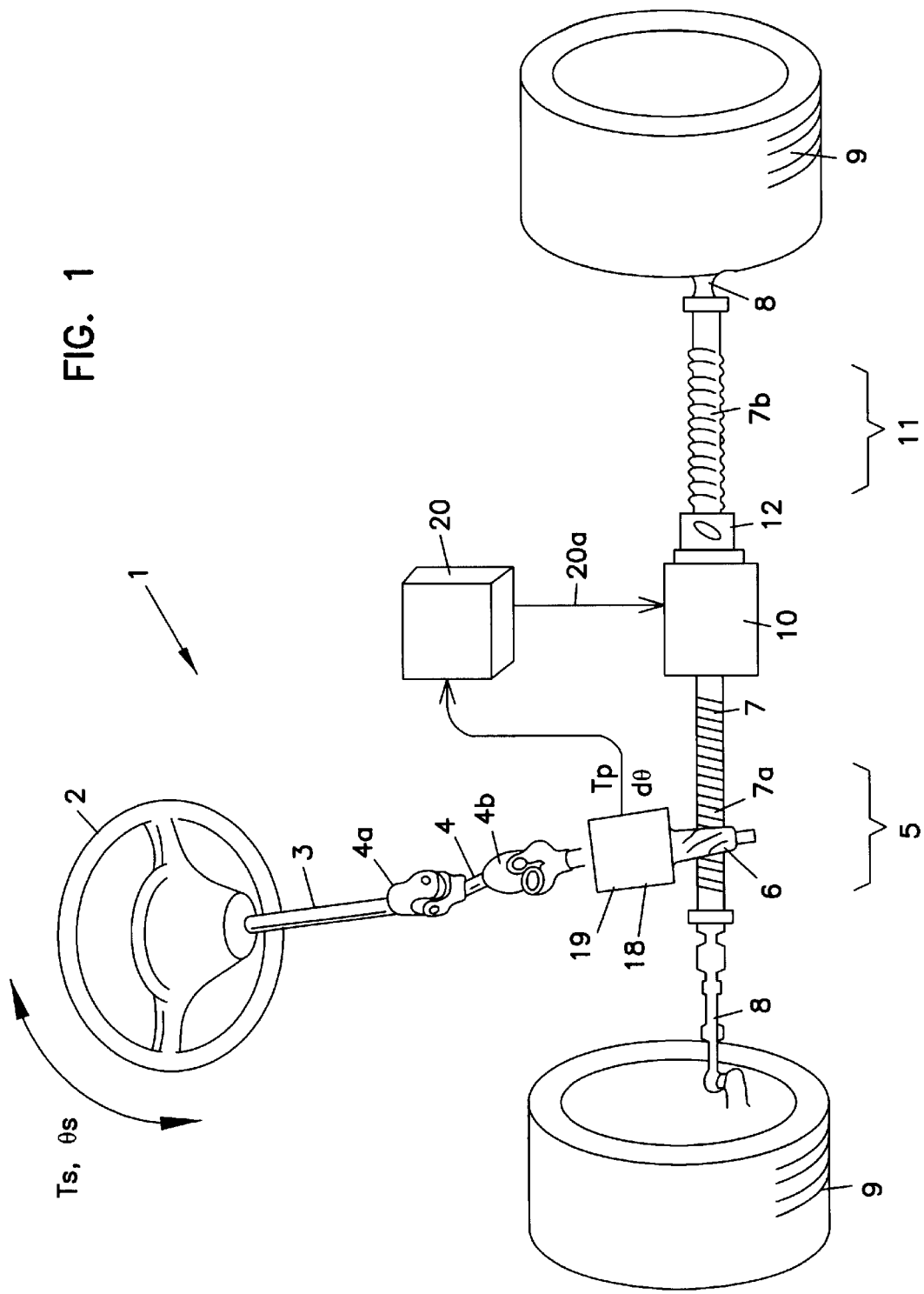
FIG. 1 is a diagrammatical view showing the general construction of an electric power steering apparatus to which the present invention pertains.
Figure 2:
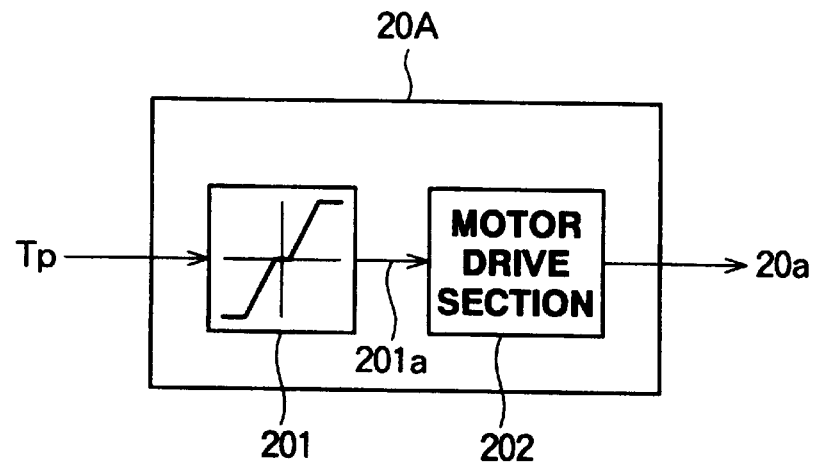
FIG. 2 is a block diagram showing a first conventional control unit of the electric power steering apparatus for controlling the steering assist torque on the basis of the steering torque.

Certain preferred embodiments of the present invention will be described in greater detail with reference to FIGS. 6 through 13 of the accompanying drawings, wherein like reference characters designate like or corresponding parts throughout several views.

Figure 6:
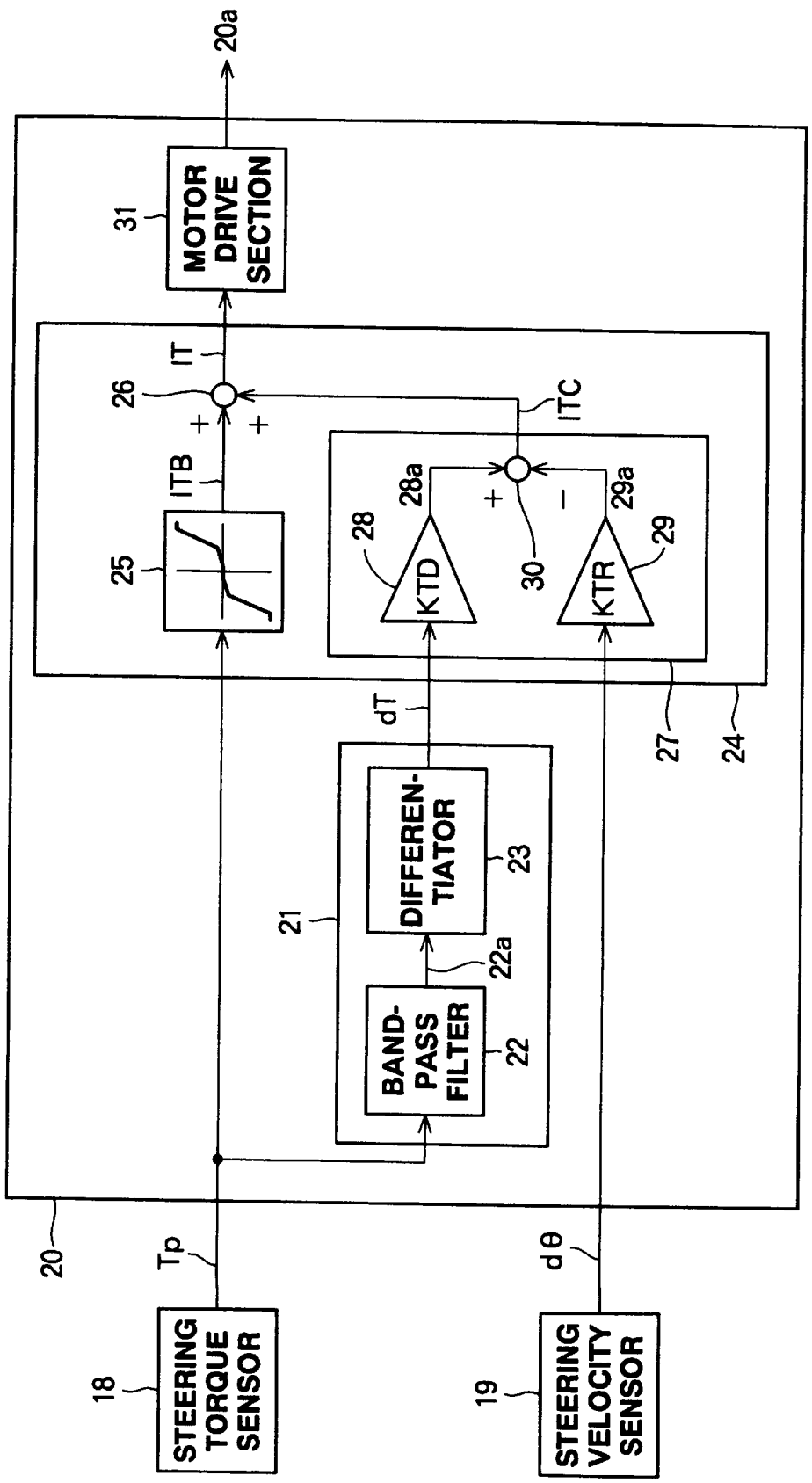
FIG. 6 is a block diagram showing the general arrangement of a control unit of the electric power steering apparatus according to a first embodiment of the present invention.

FIG. 6 shows in block diagram the general arrangement of a control unit 20 according to a first embodiment of the present invention. The control unit 20 is incorporated in an electric power steering apparatus 1, such as shown in FIG. 1. Since the general construction and operation of the electric power steering system 1 are already described above with reference to FIG. 1, further description thereof can be omitted to avoid duplication.

The control unit 20 generally comprises a steering torque differentiating section 21, a motor control signal determining section 24, and motor drive section 31. The steering torque differentiating section 21 includes a band-pass filter (BPF) 22 and a differentiating circuit or differentiator 23. The motor control signal determining section 24 includes a target signal setting means or setter 25, an adder 26, and a target value correction signal setting means or setter 27. The target value correction signal setter 27 has two multipliers 28 and 29, and a single subtractor 30.

A torque signal Tp output from a steering torque sensor 18 is supplied to the target value signal setter 25 and the steering torque differentiating section 21. The target value signal setter 25 outputs a target value signall ITB on the basis of the torque signal Tp. The target value signal ITB is supplied to the adder 26.

The band-pass filter 22 of the steering torque differentiating section 21 extracts from the torque signal Tp a signal component of a predetermined frequency band in the range of, for example, from about 2 Hz to about 100 Hz, which is free from a component near direct current (hereinafter referred to as "near-dc component") and a high frequency component. The extracted torque signal component 22a of the predetermined frequency band is supplied to the differentiator 23. The differentiator 23 performs differentiation of the extracted torque signal component 22a and outputs the result of differentiation in the form of a differential steering torque signal dT. The differential steering torque signal dT is supplied to the multiplier 28.

The multiplier 28 multiplies the differential steering torque signal dT by a predetermined coefficient KTD and outputs the result of multiplication (dT·KTD) in the form of a target correction value signal 28a which is proportional to the differential steering torque.

A steering velocity signal dθ output from a steering velocity sensor 19 is supplied to the multiplier 29. The multiplier 29 multiplies the steering velocity signal dθ by a predetermined coefficient KTR and outputs the result of multiplication (dθ·KTR) in the form of a target correction value signal 29a which is proportional to the steering velocity.

The subtractor 30 subtracts the target correction value signal 29a corresponding to the steering velocity, from the target correction value signal 28a corresponding to the differential steering torque and outputs the result of subtraction or offset (dT·KTD−dθ·KTR) in the form of a target value correction signal ITC. The target value correction signal ITC is supplied to the adder 26.

The adder 26 adds together the target value signal ITB and the target value correction signal ITC and outputs 10 the result of addition in the form of a target drive signal IT. The target drive signal IT is supplied to the motor drive section 31. The motor drive section 32 generates a motor drive signal 20a on the basis of the target drive signal IT and supplies the motor drive signal 20a to the electric motor 10 (see FIG. 1).

In the control unit 20 of the foregoing construction, the steering torque signal Tp is filtered by the band-pass filter 22 to extract a signal component of a predetermined frequency band which is free from a near-dc component and a high frequency component (harmonic component, in general). The extracted signal component 22a is differentiated by the differentiator 23 to generate a differential steering torque signal dT. The differential steering torque signal dT is multiplied by a predetermined coefficient KTD by means of the multiplier 28 to generate a target correction value signal 28a which is proportional to the differential steering torque. From the differential steering torque signal 28a, a target correction value signal 29a which is corresponding to the steering velocity is subtracted by the subtractor 30 to generate a target value correction signal ITC. The target value correction signal ITC and a target value signal ITB determined in accordance with the steering torque are added together by the adder 26 to generate a target drive signal IT. The target drive signal IT is used to control steering power assist (steering assist torque) supplied from the electric motor 10 (FIG. 1).

Partly be cause the differential steering torque signal dT is produced based on the component of steering torque signal Tp which is free from a near-dc component and a high frequency component, and partly because the gains (multiplication coefficients) of the target value correction signal determining section 27 are properly set in advance, the control unit 20 can prevent undue increase in the gain of steering power assist at a resonance frequency range while improving the response characteristics of the steering power assist system. This arrangement enables a vehicle to move straight without causing wobbling or oscillation of the steering wheel even when the vehicle is running on rough terrains. Furthermore, even when the target value signal ITB output from the target value signal setter 25 becomes zero due to the smallness of the steering torque, steering operation can be achieved smoothly with a positive steering feeding.

Figure 7A:
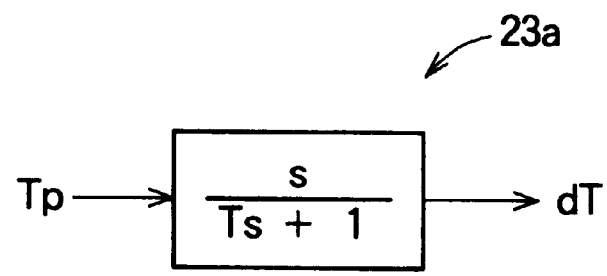
FIG. 7A is a block diagram showing an example of the structure of a differentiator of the control unit shown in FIG. 6.
Figure 7B:
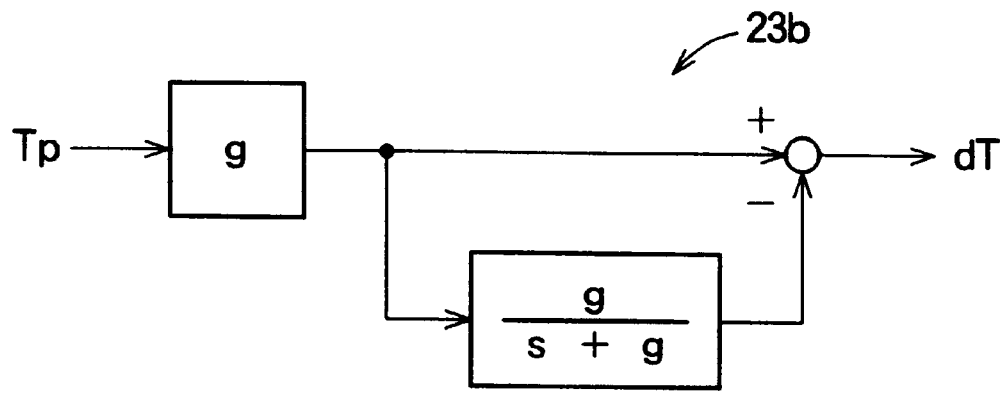
FIG. 7B is a block diagram showing another example of the structure of the differentiator.

FIGS. 7A and 7B show in block diagram two alternate examples of the differentiator 23. The differentiator 23a shown in FIG. 7A is formed by a high-pass filter (HPF) generally known per se. The differentiator 23b shown in FIG. 7B is composed of a low-pass filter (LPF) and an adder. In FIGS. 7A and 7B letters T and g are constants, and letter S is a Laplace operator.

The steering velocity sensor 19 may be replaced by a motor current sensor (not shown) and a motor drive voltage sensor (not shown) in which instance a motor current IM detected by the motor current sensor and a motor drive voltage VM detected by the motor drive voltage sensor are used to determine a rotational angular velocity θM of the electric motor in accordance with the equation: θM=(VM−R·IM)/KE where R is the terminal-to-terminal resistance of the electric motor, and KE is the counter electromotive force constant. From the motor rotational angular velocity θM thus determined, a steering velocity dθ can be obtained by estimation.

In the target value correction signal determining section 27, the coefficient KTD used for multiplication of the differential steering torque signal dT may be set by the use of a non-linear coefficient setting map in which the coefficient KTD is variable with the intensity of the differential steering torque signal dT. Alternatively, the coefficient KTD may be variable in response to the vehicle velocity. Similarly, the coefficient KTR used for multiplying the steering velocity signal dθ may be set using a non-linear coefficient setting map in which the coefficient KTR is variable with the intensity of the steering velocity signal dθ. As an alternative, the coefficient KTR may be variable in response to the vehicle velocity.

Figure 3:
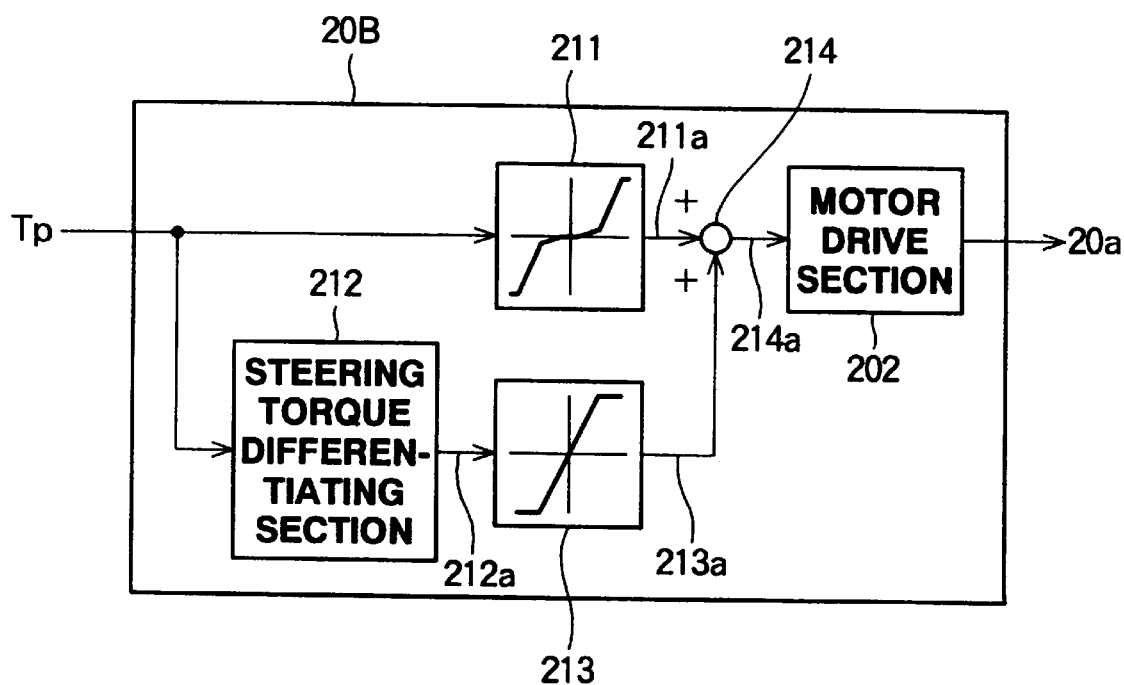
FIG. 3 is a view similar to FIG. 2, showing a second conventional control unit.
Figure 4:
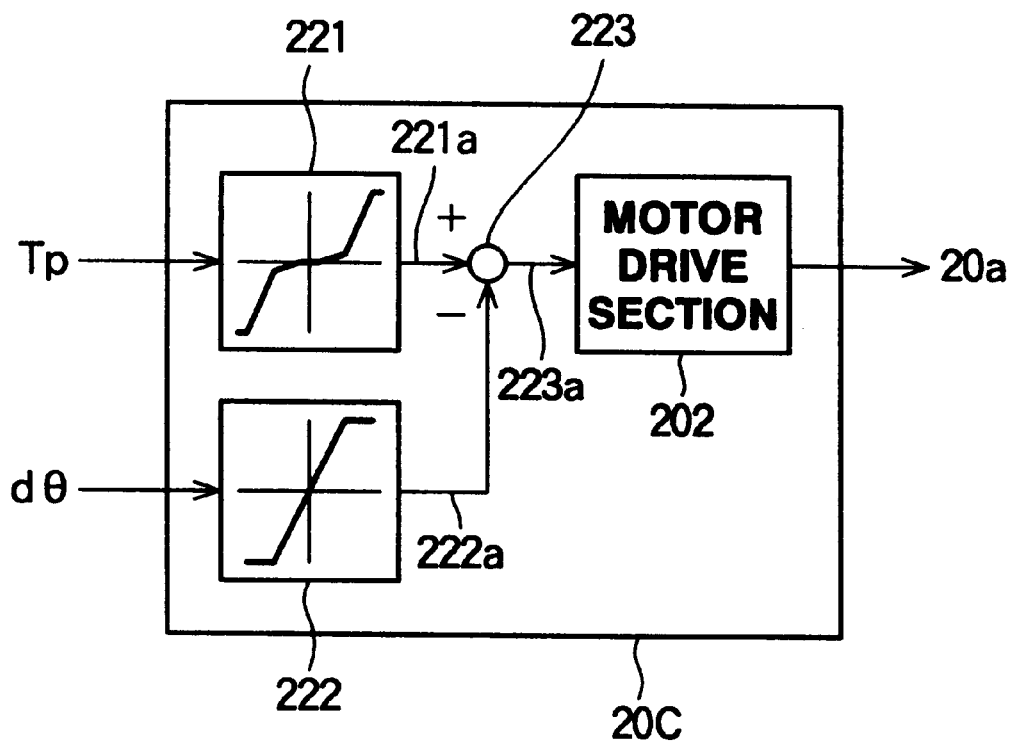
FIG. 4 is a block diagram showing a third conventional control unit arranged to control the steering assist torque on the basis of the steering torque and the steering velocity.
Figure 5:
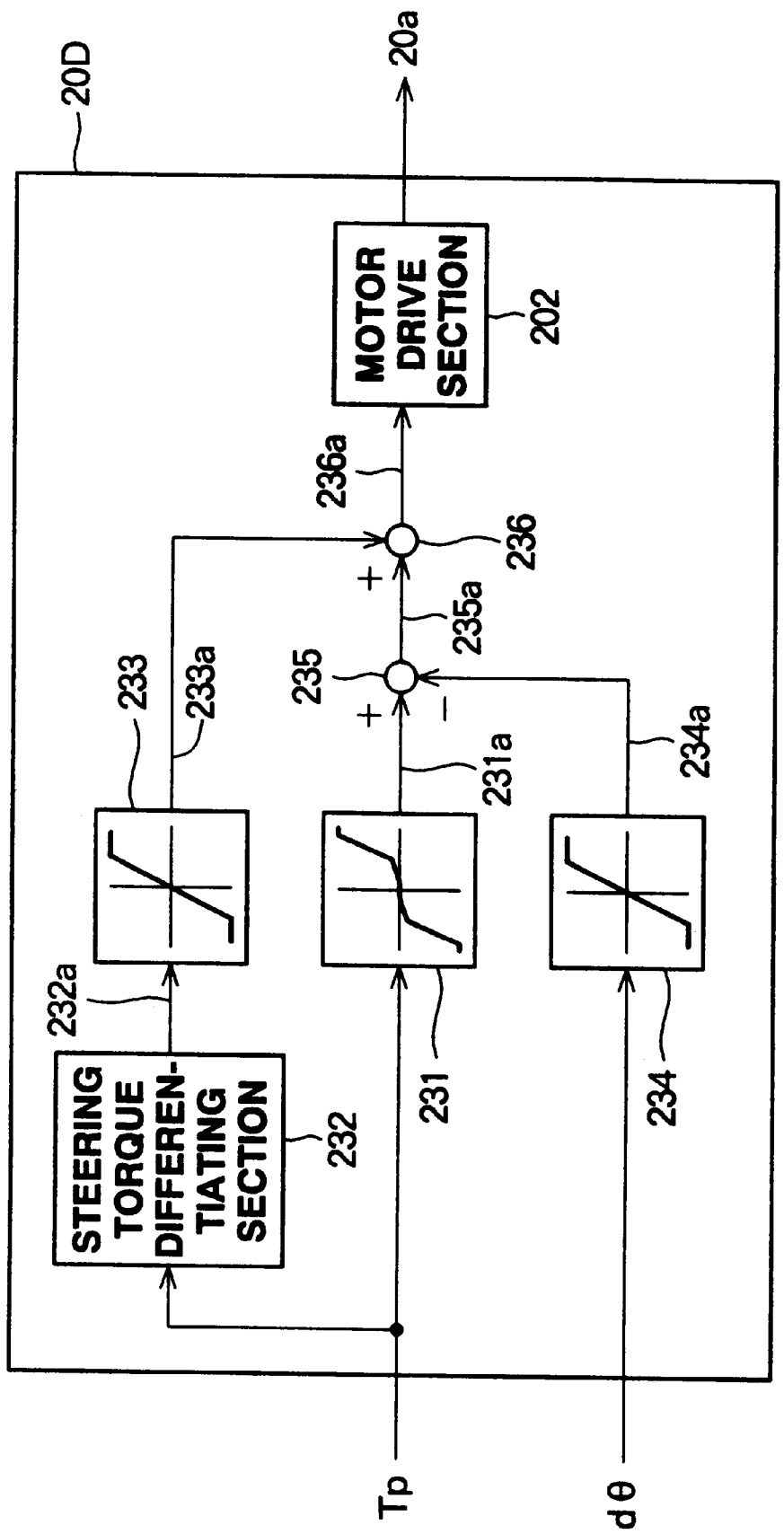
FIG. 5 is a view similar to FIG. 4, showing a fourth conventional control unit.
Figure 8A:
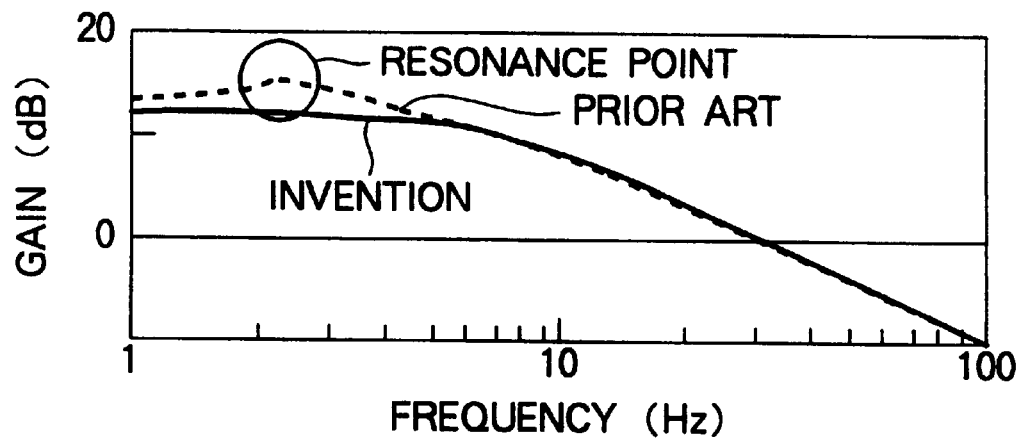
FIGS. 8A and 8B are graphs showing the frequency response characteristics of the steering power assist system.
Figure 8B:
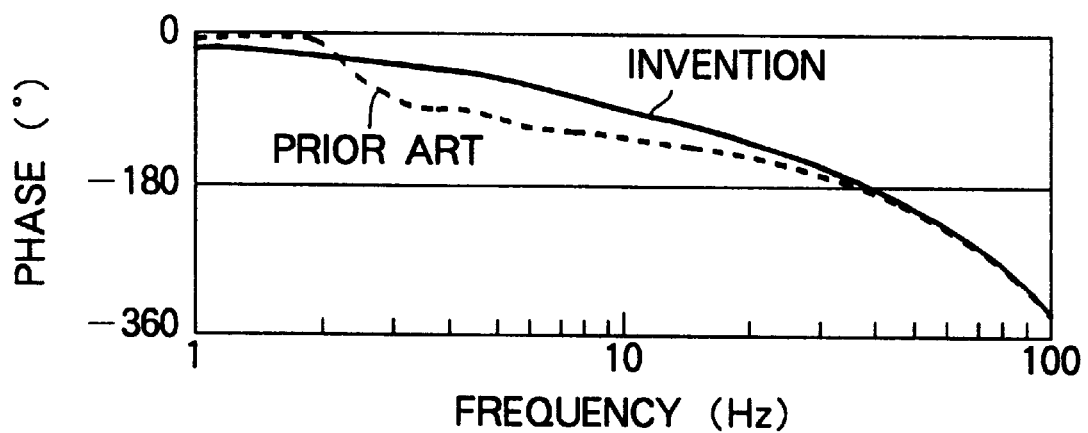

FIGS. 8A and 8B are graphical representation of the frequency response characteristics of the steering power assist system, in which FIG. 8A shows the frequency characteristics of the control gain, and FIG. 8B shows the frequency characteristics of the phase. In these figures, broken lines show the characteristics of the conventional control units 20B, 20D shown in FIGS. 3 and 5, while the solid lines show the characteristics of the control unit 20 of the present invention shown in FIG. 6.

According to the conventional control system in which the target drive signal IT is obtained by adding together a target value component ITB determined from the detected steering torque value Tp and a target value component ITC determined from the differential steering torque value dT, a resonance point (where the control gain forms a peak) is formed as indicated in a circle shown in FIG. 8A. The presence of the resonance point means that the steering power assist system tends to oscillate at this resonance frequency. The steering wheel is likely to wobble or oscillate when subjected to a counter input from the road surface or the steering input.

In order to prevent the gain from increasing at the resonance frequency, the frequency response characteristics of the band-pass filter 22 are set such that the subtraction coefficient ζ at the resonance point is approximately 0.6 or more; the respective multiplication coefficients KTD and KTR of the target value correction signal setter 27 are properly set; and the target correction value 29a corresponding to the steering velocity is subtracted from the target correction value 28a corresponding to the differential torque of the component having a limited frequency band, so as to produce a value used as the target value correcting component ITC. With this arrangement, the gain characteristic at frequencies in the range of 2 to 4 Hz becomes flat, as indicated by the solid lined curve shown in FIG. 8A. The electric power steering apparatus having such gain characteristic curve has a high level of response the steering input and is highly resistant to external disturbances tending to wobble or oscillate the steering wheel.

Figure 9:
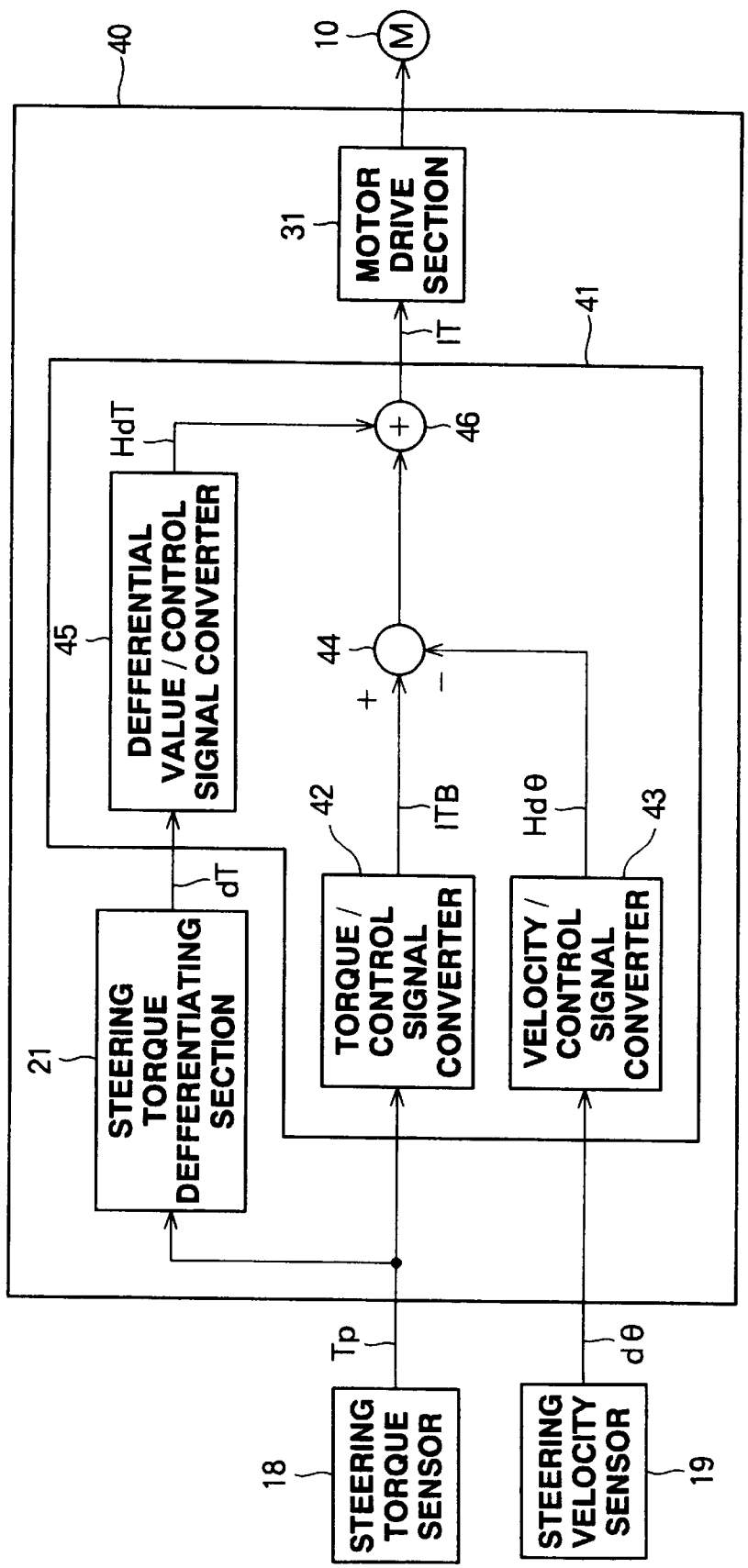
FIG. 9 is a block diagram showing the general arrangement of a control unit according to a second embodiment of the present invention.

FIG. 9 shows, in block diagram, the general arrangement of a control unit of the electric power steering apparatus according to a second embodiment of the present invention.

The control unit 40 is constructed by using a microcomputer system and includes a steering torque differentiating section 21, a motor control signal determining section 41, and a motor drive section 31. The motor control signal determining section 41 includes a torque to control signal converter 42, a velocity to control signal converter 43, a subtractor 44, a differential value to control signal converter 45, and an adder 46.

In FIG. 9, an analog-to-digital (A/D) converter for performing analog-to-digital conversion of a steering torque signal Tp output from a steering torque sensor 18 and an A/D converter for analog-to-digital conversion of a steering velocity signal dθ output from the steering velocity sensor 19 are omitted from illustration.

The steering torque signal Tp output from the steering torque sensor 18 is supplied to the steering torque differentiating section 21 and the torque to control signal convertor 42. The steering velocity signal dθ output from the steering velocity sensor 19 is supplied to the velocity to control signal converter 43.

The steering torque differentiating section 21 performs differential operation with respect to a component of the steering torque signal Tp having a predetermined frequency band (such as 4 to 100 Hz) and outputs a differential steering torque signal dT of the predetermined frequency band. The steering torque differentiating section 21 is composed of, for example, a band-pass digital filter and a differential operator. The differential steering torque signal dT is supplied to the differential value to control signal converter 45.

The differential value to control signal converter 45 has a differential steering torque value to target correction value (dT–HdT) conversion table for converting the differential steering torque value dT to a target correction value HdT corresponding thereto. The conversion table is preferably formed by an ROM in which conversion data theoretically or experimentally determined in advance are stored. The differential value to control signal converter 45 outputs a target correction value HdT corresponding to the differentia steering torque value dT. The target correction value HdT is supplied to the adder 46.

Figure 10:
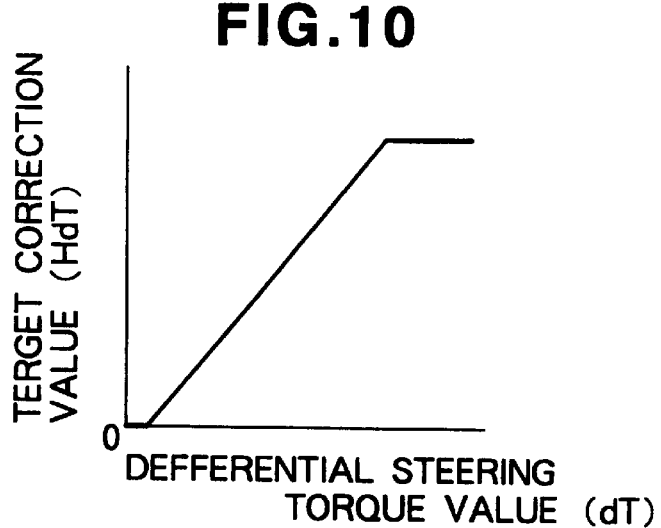
FIG. 10 is a graph showing the relationship between the differential steering torque value and the target correction value.

FIG. 10 is a graphical representation of the relationship between the differential steering torque value dT and the target correction value HdT. As shown in this FIGURE, when the differential steering torque value dT is less than a predetermined value, the target correction value HdT is set to be 0 (zero). When the differential steering torque value dT exceeds the predetermined value, the target correction value HdT increases directly with the differential steering torque value dT. The target correction value HdT has an upper limit.

The torque to control signal converter 42 has a steering torque to target value (Tp–ITB) conversion table for converting the steering torque Tp to a target value ITB corresponding thereto. The conversion table is preferably formed by an ROM in which conversion data theoretically or experimentally determined in advance are stored. The torque to control signal converter 42 outputs a target value ITB corresponding to the steering torque Tp. The target value ITB is supplied to the subtractor 44.

Figure 11:
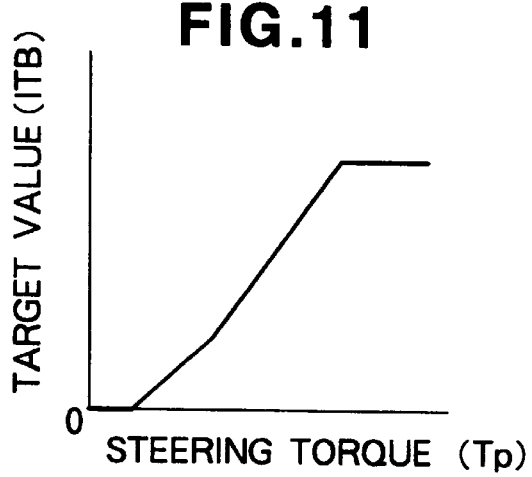
FIG. 11 is a graph showing the relationship between the steering torque and target value.

FIG. 11 is a graphical representation of the relationship between the steering torque Tp and the target value ITB. As shown in this figure, when the steering torque Tp is less than a predetermined value, the target value ITB is set to be 0 (zero). When the steering torque Tp becomes greater than the predetermined value, the target value ITB increases directly with the steering torque Tp. The target ITB has an upper limit.

The velocity to control signal converter 43 has a steering velocity to target correction value (dθ–Hdθ) conversion table for converting the steering velocity dθ to a target correction value Hdθ corresponding thereto. The conversion table is preferably formed by an ROM in which conversion data theoretically or experimentally determined in advance are stored. The velocity to control signal converter 43 outputs a target correction value Hdθ corresponding to the steering velocity dθ. The target correction value Hdθ is supplied to the subtractor 44.

Figure 12:
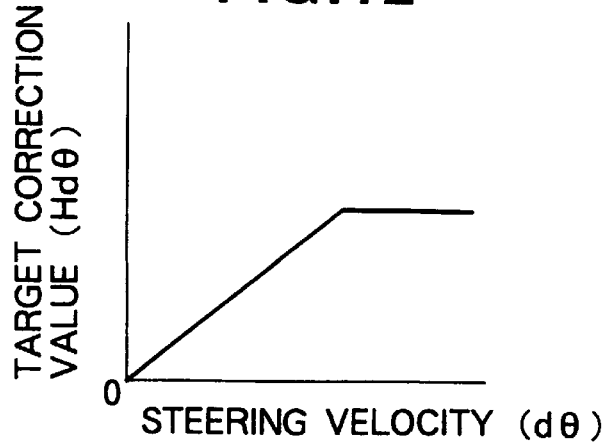
FIG. 12 is a graph showing the relationship between the steering velocity and the target correction value.

FIG. 12 is a graphical representation of the relationship between the steering velocity dθ and the target correction value Hdθ. As shown in this figure, when the steering velocity dθ is less than a predetermined value, the target correction value Hdθ is set to be 0 (zero). When the steering velocity dθ becomes greater than the predetermined value, the target correction value Hdθ increases directly with the steering velocity dθ. The target correction value Hdθ has an upper limit.

The subtractor 44 subtracts the target correction value Hdθ corresponding to the steering velocity, from the target value ITB corresponding to the steering torque Tp and supplies an offset (ITB–Hdθ) to the adder 46. The adder 46 adds together the offset signal (ITB–Hdθ) and the target correction value HdT corresponding to the differential torque and outputs the resultant signal (ITB–Hdθ+HdT) indicative of a target drive value IT. The target drive value IT output from the adder 46 is supplied to the motor drive section 31 which drives the electric motor 20 on the basis of the target drive value IT.

With this arrangement, the control unit 40 shown in FIG. 9 enables the electric motor 10 to generate steering power assist (assist torque) corresponding to a steering operation (steering torque Tp and steering velocity dθ) taken by the driver and applies the assist power to the steering system. More specifically, a variation of the steering torque Tp is detected by the steering torque differentiating section 21 to generate a differential steering torque value dT which in turn is converted into a target correction value HdT by means of the differential value to control signal converter 45. The target correction value HdT corresponding to the differential steering torque value dT is added to a target value ITB corresponding to the steering torque Tp by means of the adder 46. With this arrangement, a proper steering assist torque is provided in immediate response to the steering operation even when the steering wheel is manipulated abruptly. Furthermore, the target value ITB is corrected by subtracting therefrom a target correction value Hdθ which is determined by the velocity to control signal converter 43 in response to the steering velocity dθ. Since the steering assist torque is reduced with an increase in the steering velocity dθ, it becomes possible to prevent unnecessary steering power assist from being supplied in response to a sudden steering operation by the driver. Thus, the steering power assist is supplied in such a manner that the assist torque varies smoothly, thereby making the electric power steering apparatus superior in steering characteristics.

FIG. 13 shows, in block diagram, the general arrangement of a control unit of the electric power steering apparatus according to a third embodiment of the present invention.

The control unit 51 is constructed by using a microcomputer system and includes a steering torque differentiating section 21, a motor control signal determining section 51, and a motor drive section 31. The motor control signal determining section 51 includes a torque to control signal converter 42, a velocity to control signal converter 43, a differential value to control signal converter 45, a steering condition sensor 52, a return stroke control signal calculating section 53, a forward stroke control signal calculating section 54, a selecting section 55, a steering torque direction determining section 56, a direction disagreement control signal calculating section 57, a direction agreement control signal calculating section 58, and a switching section 59.

In FIG. 13, an analog-to-digital (A/D) converter for performing analog-to-digital conversion of a steering torque signal Tp output from a steering torque sensor 18 and an A/D converter for analog-to-digital conversion of a steering velocity signal dθ output from the steering velocity sensor 19 are omitted from illustration. The torque to control signal converter 42, the velocity to control signal converter 43, and the differential value to control signal converter 45 are the same as those shown in FIG. 9.

The steering condition sensor 52 has a sign judgment function in which a sign code F indicative of the direction of a steering torque signal Tp and a sign code G indicative of the direction of a steering velocity signal dθ are compared and when the two sign codes are in agreement with each other (F=G: forward steering stroke), a steering condition signal St at a high (H) level, for example, is output, and when the two sign codes are in disagreement with each other (F≠G: return steering stroke), a steering condition signal St at a low (L) level is output. The steering condition signal St is supplied to the selecting section 55.

The return stroke control signal calculating section 53 adds together a target value signal ITB corresponding to the steering torque Tp output from the torque to control signal converter 42 and a target value correction signal Hdθ corresponding to the steering velocity dθ output from the velocity to control signal converter 43 and outputs the resultant sum signal (ITB+Hdθ) to the selecting section 55.

The forward stroke control signal calculating section 54 subtracts the target value correction signal Hdθ from a target value signal ITB corresponding to the steering torque Tp and outputs the resultant offset signal (ITB−Hdθ) to the selecting section 55.

The selecting section 55 selects and outputs the offset signal (ITB−Hdθ) when the steering condition signal St is at the H level (forward steering stroke condition). Conversely, when the steering condition signal St is at the L level (return steering stroke condition), the sum signaL (ITB+Hdθ) is selected and output from the selecting section 55. The first target correcting value (ITB±Hdθ) selected in accordance with the forward or return stroke of the steering operation is supplied to the direction disagreement control signal calculating section 57 and the direction agreement signal calculating section 58.

The steering torque direction determining section 56 has a sign judgment function similar to that of the steering condition sensor 52. By the sign judgment function, the sign code F indicative of the direction of the steering torque and a sign code H indicative of the direction of a differential steering torque value dT from the steering torque differentiating section 21 are compared, and when the two sign codes are in agreement with each other (F=H), a steering torque direction signal Ht at a high (H) level, for example, is output, and when the two sign codes are in disagreement with each other (F≠H), a steering torque direction signal Ht at a low (L) level is output. The steering torque direction signal Ht is supplied to the switching section 59.

The direction disagreement control signal calculating section 58 subtracts a target correction value HdT output from the differential value to control signal converter 45 in response to the differential steering torque value dT, from the first target correction value (ITB±Hdθ) supplied from the selecting section 55 and outputs the resultant offset signal as a second target correction value (ITB+Hdθ−HdT), (ITB−Hdθ−HdT) —HdT subtraction correction—. The second target correction value (ITB+Hdθ−HdT), (ITB−Hdθ−HdT) 12 is supplied to the switching section 59.

The direction agreement control signal calculating section 58 adds together the first target correction value (ITB±Hdθ) supplied from the selecting section 55 and the target correction value HdT output from the differential value to control signal converter 45 and outputs the resultant sum signal as a second target correction value (ITB+Hdθ+HdT), (ITB−Hdθ+HdT) —HdT addition correction—. The second target correction value (ITB+Hdθ+HdT), (ITB−Hdθ+HdT) to the switching section 59.

The switching section 59 selects the second target correction value (ITB+Hdθ+HdT), (ITB−Hdθ+HdT) and output the same as a target drive value IT when the steering torque direction signal Ht is at the H level (F=H). Conversely, when the steering torque direction signal Ht is at the L level (F≠H), the switching section 59 selects the second target correction value (ITB+Hdθ−HdT), (ITB−Hdθ−HdT) and outputs the same as the target drive value IT.

The target drive value IT is supplied to the motor drive section 31 which controllably drives the electric motor 20 on the basis of the target drive value IT.

By virtue of the steering condition sensor 52 and the steering torque direction determining section which are provided in addition to the steering torque differentiating section 21 and the differential value to control signal converter 45, the control unit 50 shown in FIG. 13 can provide steering power assist (steering assist torque) without delay when a variation in the steering torque signal Tp exceeds a predetermined value due to sudden steering operation. Furthermore, by virtue of a combination of the steering condition (forward stroke or return stroke) and the torque direction agreement/disagreement condition, the steering power assist is provided in an optimum condition.

As described above, with respect to a value corresponding to the steering torque, a value corresponding to a differential value of a component of the steering torque which is free from a near-dc component and a high frequency component is added and a value corresponding to the steering velocity is subtracted, and the resultant value is used to control steering power assist (steering assist torque) supplied from the electric motor. With this arrangement. the electric power steering apparatus can prevent undue increase in the gain of control system at a low frequency range such as 2 to 4 Hz while increasing the response characteristics of the steering power assist system. A vehicle equipped with the electric power steering apparatus can exhibit high running stability without causing wobbling or oscillation of the steering wheel even when the vehicle is running on rough terrains. Furthermore, even when the steering torque is very small, steering operation can be performed smoothly and reliably with positive steering feeling.

Obviously, various minor changes and modifications are possible in the light of the above teaching. It is to be understood that within the scope of the appended claims thE/: present invention may be practiced otherwise than as specifically described.

What is claimed is:

1. An electric power steering apparatus comprising:
   a steering torque sensor for detecting a steering torque of a steering system;
   a steering velocity sensor for detecting a steering velocity of said steering system;
   a steering torque differentiating section for producing a differential value of the steering torque;
   a motor control signal determining section including a target value setter which receives a signal value corresponding to the steering torque and which outputs a target value, said determining section for subtracting a value corresponding to the steering velocity from a value corresponding to the differential value of the steering torque to obtain a result of the subtraction and adding said target value to the result of the subtraction to thereby determine a motor control signal;

an electric motor for providing an assist torque to said steering system;

a motor drive section for driving said electric motor according to the motor control signal; and said steering torque differentiating section being arranged to output a differential value of a component of the steering torque which is free from a component near direct current and a high frequency component;

wherein said steering torque differentiating section includes a band-pass filter that passes a component of the steering torque having a predetermined frequency band, and a differentiating circuit for achieving differentiating operation of said steering torque component passed through said band-pass filter, wherein said band-pass filter is a band-pass filter that passes a component of the torque signal having frequencies in the range of from 2 to 100 Hz.

2. An electric power steering apparatus according to claim 1, wherein said motor control signal determining section includes:

a target value setter arranged to output said value corresponding to the steering torque as a target value, a first multiplier for multiplying said value corresponding to the differential value of the steering torque by a predetermined first coefficient and outputting the result of multiplication as a first target correction value corresponding to the differential value, a second multiplier for multiplying said value corresponding to the steering velocity by a predetermined second coefficient and outputting the result of multiplication as a second target correction value corresponding to the steering velocity, a subtractor for subtracting said second target correction value from said first target correction value and outputting the result of subtraction as a third target correction value, and an adder for adding together said target value output from said target value setter and said third target correction value output from said subtractor to thereby determine said motor control signal.

3. An electric power steering apparatus according to claim 1, wherein said motor control signal determining section includes:

a torque to control signal converter arranged to output a target value corresponding to the steering torque, a velocity to control signal converter arranged to output a first target correction value corresponding to the steering velocity, a subtractor for subtracting said first target correction value from said target value and outputting an offset between said first correction value and said target value, a differential value to control signal converter arranged to output a second target correction value corresponding to the differential value of the steering torque, and an adder for adding together said offset and said second target correction value to thereby determine said motor control signal.

4. An electric power steering apparatus according to claim 3, wherein said differential value to control signal converter has a differential steering torque value to target correction value conversion table that converts a differential steering torque value to a second target correction value corresponding thereto, said torque to control signal converter has a steering torque to target value conversion table that converts a steering torque to a target value corresponding thereto, and said velocity to control signal converter has a steering velocity to target correction value conversion table that converts a steering velocity to a first target correction value corresponding thereto.

5. An electric power steering apparatus according to claim 3, wherein said motor control signal determining section further includes a steering condition sensor for detecting a steering condition on the basis of a direction of said steering torque and a direction of said steering velocity, a return stroke control signal calculating section for adding together the target value output from said torque to control signal converter and the first target correction value output from said velocity to control signal converter, and outputting a sum of the target value and the first target correction value, a forward stroke control signal calculating section for subtracting the first target correction value output from said velocity to control signal converter, from the target value output from said torque to control signal converter and outputting an offset between the target value and the first target correction value, a selecting section for, when the steering condition detected by said steering condition sensor is in the forward steering stroke state, selecting said offset and outputting the offset as a third target correction value, and when the steering condition detected by said steering condition sensor is in the return steering stroke state, selecting said sum and outputting the sum as said third target correction value, a steering torque direction determining section for determining a direction of the steering torque on the basis of said direction of the steering torque and a direction of said differential steering torque value, a direction disagreement control signal calculating section for subtracting said second target correction value output from said differential value to control signal converter, from said third target correction value output from said selecting section, and outputting an offset between the third target correction value and the second target correction value as a fourth target correction value, a direction agreement control signal calculating section for adding said third target correction value output from said selecting section and said second target correction value output from said differential value to control signal converter, and outputting a sum of said second and third target correction values as a fifth target correction value, and a switching section for, when said direction of the steering torque and said direction of the differential value are in agreement with each other, selecting said fourth target correction value and outputting the same as said motor control signal, and when said direction of the steering torque and said direction of the differential value are in disagreement with each other, selecting said fifth target correction value and outputting the same as the motor control signal.

6. An electric power steering apparatus comprising:

a steering torque sensor for detecting a steering torque of a steering system;

a steering velocity sensor for detecting a steering velocity of said steering system;

a steering torque differentiating section for producing a differential value of the steering torque;

a motor control signal determining section including a target value setter which receives a signal value corresponding to the steering torque and which outputs a target value, said determining means for subtracting a value corresponding to the steering velocity from a value corresponding to the differential value of the steering torque to obtain a result of the subtraction and adding said target value to the result of the subtraction to thereby determine a motor control signal;

an electric motor for providing an assist torque to said steering system;

a motor drive section for driving said electric motor according to the motor control signal; and said steering torque differentiating section being arranged to output a differential value of a component of the steering torque which is free from a component near direct current and a high frequency component.

* * * * *